United States Patent
Suman et al.

(10) Patent No.: US 9,613,243 B2
(45) Date of Patent: Apr. 4, 2017

(54) APPARATUS AND METHOD FOR READING OPTICAL INFORMATION WITH LOW-FATIGUE VISUAL INTERFACE

(71) Applicant: Datalogic IP Tech S.R.L., Calderara di Reno (Bologna) (IT)

(72) Inventors: Michele Suman, Ponte San Nicolo (IT); Marco Gnan, Bologna (IT); Lara Sambo, San Pietro in Casale (IT)

(73) Assignee: Datalogic IP Tech S.r.l., Calderara di Reno (Bologna) (IT)

( * ) Notice: Subject to any disclaimer, the term of this patent is extended or adjusted under 35 U.S.C. 154(b) by 0 days.

(21) Appl. No.: 14/760,700

(22) PCT Filed: Jan. 14, 2013

(86) PCT No.: PCT/IB2013/050347
§ 371 (c)(1),
(2) Date: Jul. 13, 2015

(87) PCT Pub. No.: WO2014/108761
PCT Pub. Date: Jul. 17, 2014

(65) Prior Publication Data
US 2015/0339507 A1 Nov. 26, 2015

(51) Int. Cl.
*G06K 7/10* (2006.01)
*G06K 7/12* (2006.01)
*H04N 1/00* (2006.01)

(52) U.S. Cl.
CPC ........... *G06K 7/12* (2013.01); *G06K 7/10544* (2013.01); *H04N 1/00334* (2013.01)

(58) Field of Classification Search
CPC ............ G06K 7/10881; G06K 7/1404; G06K 2207/1011
(Continued)

(56) References Cited

U.S. PATENT DOCUMENTS

| | | | |
|---|---|---|---|
| 7,568,629 B2 * | 8/2009 | Lapstun | G06F 3/014 235/462.01 |
| 8,936,195 B1 * | 1/2015 | Chang | G06K 7/10831 235/462.21 |

(Continued)

OTHER PUBLICATIONS

Hecht, Selig, "The Visual Discrimination of Intensity and the Weber-Fechner Law", The Journal of General Physiology 1924, Sep. 25, 1924, pp. 235-267.
(Continued)

*Primary Examiner* — Daniel St Cyr
(74) *Attorney, Agent, or Firm* — Dentons US LLP

(57) ABSTRACT

An apparatus and method for reading optical information and that includes an interface with reduced visual fatigue. In an embodiment, the apparatus may include an acquisition means for acquiring the optical information. The apparatus may further include a body with a frontal face to be disposed between a minimum and maximum work distance, an illuminating means for emitting an illuminating pattern, an aiming means for emitting an aiming pattern, an indicating means for emitting a reading apparatus outcome pattern. The illuminating means, aiming means, and indicating means including respective non-coherent light sources, and each are configurable by operating parameters that include wavelengths of each of the light sources are selectable. The wavelength of the aiming means may range from 430 to 470 nm, illuminating means may range from 590 to 650 nm, and indicating means may range from 530 to 560 nm.

37 Claims, 4 Drawing Sheets

(58) Field of Classification Search
USPC .................. 235/462.21, 462.45, 472.01
See application file for complete search history.

(56) References Cited

U.S. PATENT DOCUMENTS

| | | | |
|---|---|---|---|
| 9,082,031 B2* | 7/2015 | Liu ...................... | G06K 7/1098 |
| 9,301,427 B2* | 3/2016 | Feng .................... | H05K 7/2039 |
| 2007/0108284 A1* | 5/2007 | Pankow ............. | G06K 7/10851 |
| | | | 235/454 |

OTHER PUBLICATIONS

Kim, M.H., Weyrich, T., Kautz, J., "Modeling Human Color Perception under Extended Luminance Levels, Proceedings ACM SIGGRAPH 2009", Aug. 2009, pp. 27:1-27:9.

Sharpe, L.T., Stockman, A., Jagla, W., Jagle, H., "A Luminous Efficiency Function, $V^*(\lambda)$, for Daylight Adaptation", Journal of Vision 5 (11), 2005, pp. 948-968, 2005.

Schanda, Janos, "The Future of Colorimetry in the CIE : Color Appearance". Colorimetry: Understanding the CIE System. Wiley Interscience. p. 359. ISBN 978-0-470-04904-4, 2007.

Ramamurthy, V. et al, SPIE Proceedings vol. 5187: pp. 294-300, 2004.

Sagi, D. and Julesz, B., Spatial Vision, vol. 2, No. 1, pp. 39-49, 1987.

International Search Report of PCT/IB2013/050347 mailed Apr. 10, 2013, 2 pps.

\* cited by examiner

APPARATUS AND METHOD FOR READING OPTICAL INFORMATION WITH LOW-FATIGUE VISUAL INTERFACE

CROSS REFERENCE TO RELATED APPLICATIONS

This application is a 371 National Stage Application of international Application No. PCT/IB2013/050347, filed Jan. 14, 2013, which is incorporated herein by reference in its entirety.

BACKGROUND

Field of the Invention

The invention relates to an apparatus and method for reading optical information, in particular an apparatus and a reading method with an interface with reduced visual fatigue.

Description of Related Art

Reading apparatuses are known for reading optical information found in an object that comprise: optical information acquisition means; illuminating means associated with this acquisition means for emitting, during use by a user, an illuminating pattern of a zone that is at least equal to the field of view of the acquisition means in which this optical information is positionable and thus enabling the acquisition thereof; aiming means for emitting at least one luminous aiming pattern in a space in front of a frontal face of the apparatus, to guide a user in positioning the optical information inside the field of view of the acquisition means; and indicating means of a reading outcome to emit a reading outcome pattern that is suitable, for example, for providing an indication that is green in colour to indicate a positive reading outcome. The illuminating pattern, the aiming pattern and the reading outcome pattern define an HMI (Human Machine Interface) of the reading apparatus based on the visual perception by the user, to guide a user in reading optical information found in an object correctly.

These reading apparatuses can be, for example, of fixed type, and be, for example, connected to a supporting base the position of which does not vary over during operation of the apparatus or be portable reading apparatuses that are holdable by a user. In both cases, the user has to position the optical information in the object in such a manner that it is framed by the acquisition means of the reading apparatus, by moving the object to arrange the optical information in the field of view of the acquisition means or, in the case of portable reading apparatuses, by moving the portable device to frame the optical information as well as possible.

The expression "optical information" means any graphic representation that constitutes information, whether coded or uncoded.

One example of coded information is an optical, linear or two-dimensional code, in which the data are coded that identify the object with which the optical code is associated. The information is coded by suitable combinations of elements of a preset shape, for example squares, rectangles or hexagons, of a dark colour (normally black) separated by light elements (spaces that are normally white), and barcodes, stacked codes and two-dimensional codes in general, colour codes, etc, are known.

The term "optical information" further comprises, more in general, also other graphic shapes, which include printed or handwritten characters (letters, numbers, etc) and particular shapes (so-called "patterns"), such as, for example, stamps, logos, signatures, fingerprints, etc and any graphic representation that is detectable not only in the field of visible light but also along the entire wavelength comprised between infrared and ultraviolet.

In the case of coded information, whether it be linear or two-dimensional codes or graphic shapes, the acquisition means for acquiring optical information can be made of electronic sensor image acquisition devices having, for example, an array of to photosensitive elements of linear or matrix type for example of the CCD or CMOS type, that are able to acquire images of an object, and in particular to process said images in such as manner as to extract optical information therefrom that is associated with the object.

The reading apparatus further comprises a control device, for commanding the acquisition of the image, emitting the illuminating pattern, emitting the aiming pattern and the reading outcome pattern within the appropriate time and processing and/or decoding the acquired optical information.

"Field of view" is to be understood as an acquisition field of the reading apparatus, i.e. a preset area inside which the images of the object can be acquired, which is located within a focusing range and for which, along the optical axis of the optical receiving means, it is possible to define a depth of field. The optical information must therefore be arranged at a distance from the frontal face of the reading apparatus that is typically comprised between a distance of 0 mm and a maximum work distance, defining a range that corresponds to the depth of field of the apparatus.

The illuminating means comprises one or more electronically controllable light emitters, for example LEDs, "light emitting diodes", which are typically arranged to illuminate appropriately the optical information in the object and emit a luminous pattern of suitable power. In particular, the illuminating means has to illuminate at least the entire acquisition field of view of the reading apparatus with which it is associated, in all the corresponding depth of field.

The aiming means usually comprises a first, and optionally, a second luminous emitter, typically a laser, for emitting a luminous aiming pattern that is substantially aligned or slightly misaligned with respect to a line passing through the centre of the acquisition means, or optical axis, and having one or more luminous portions arranged with respect to this axis in such a manner as to indicate to the user, at the various reading distances, the optimum zone in which to position the optical information. In particular, the pattern can preferably indicate the centre of the field of view or an area (figure) containing the field of view or more preferably an imaginary segment the centre of which coincides with the centre of the field of view. The field of view can also be extended in relation to this area (figure) or imaginary segment.

The reading outcome indicating means is on the other hand suitable for emitting a luminous pattern, which is typically circular or has an easily recognisable shape and is coloured to provide an indication, typically green in colour, to indicate a positive reading outcome, i.e. that the image has been acquired successfully and/or that the optical information present therein has been successfully decoded.

FIG. 1 shows optical information 1 in an object (which is not shown), which in the specific case represented is a barcode. This optical information lies on a plane and is, in use, illuminated by an illuminating pattern 2 that identifies a rectangular luminous background zone of the object.

A luminous aiming pattern 3 consists of portions 3a and 3b, which are triangular in shape, the opposite vertices of which are aligned to indicate the imaginary segment the centre of which coincides with the centre of the field of view. Preferably, each triangle is equilateral.

The luminous aiming pattern is emitted at the same time as or immediately before the illuminating pattern and is in the same zone of the illuminating pattern but is of a different colour from the latter to be distinguished therefrom. The user is thus guided in positioning the reading apparatus with respect to the optical information, as the optical information is correctly framed by the image acquisition apparatus if the centre thereof corresponds substantially to the centre of the imaginary segment indicated by the aiming means.

With 4 a luminous circular reading outcome pattern is indicated, which is also usually positioned in the rectangular background zone 2, which is conventionally of a green colour and is emitted at the same time as the illuminating pattern, or immediately thereafter, but anyway alternatively to the aiming pattern 3. The reading outcome pattern 4 is in fact emitted after the aiming pattern 3 is switched off and processing of the coded information has taken place.

From what has been said above, it is clear that the visual interface HMI of the reading apparatus comprises three distinct luminous patterns distinguished by different colours, with distinct functions. As the user, whilst using the reading apparatus, also has to gaze at the visual interface for a long time, it is necessary for each luminous pattern to be easily distinguishable from the others and not to cause visual fatigue to the user.

It is observed that the aiming means comprising a laser emitter is able to emit an aiming pattern 3 bounded by well-defined contours over the entire work range of the reading apparatus, as the light emitted by the laser emitter is of the coherent type and, if appropriately collimated, enables both brilliancy and focus to be maintained over the entire work range and thus over the entire depth of field. The aiming pattern 3 is thus easily visible to a user.

Nevertheless, laser emitters are increasingly frequently being replaced by LED emitters, to reduce the costs of the reading apparatuses and to reduce eye damage. In fact, such laser emitters could, even if suitably dimensioned in such a manner as not to induce harm to the retina, temporarily compromise the sight of the person affected, if a user were to inadvertently look not at the aiming pattern 3 projected onto the plane containing the code but at the light emitted directly by the laser emitter.

If the aiming device were to comprise a LED emitter, or anyway an emitter that emits non-coherent light, the emitted luminous pattern would have a luminous intensity that diminishes as it moves away from the emission face of the reading apparatus, reducing the visibility thereof. Further, with this type of source, the optimum focus of the aiming pattern would be obtained only at a set distance and would also deteriorate moving away from this distance. The speed at which the focus deteriorates is influenced by the parameters of the optical system such as, for example, numerical aperture.

If it is desired to use a visual HMI interface comprising luminous patterns emitted exclusively by LED emitters or which are not coherent, it is thus necessary to try to improve the perception thereof by a user, at least from a distance from the frontal face of the apparatus of 50 mm, assuming that for distances comprised between 0 and 50 mm from the frontal face, the user instinctively aims the optical code at the reading apparatus, without the need to use the HMI visual interface. A significant range in which the perception of a luminous pattern has to be improved can thus be defined in the work range, from 50 mm to the maximum work distance.

In a reading apparatus of coded information comprising image acquisition means and luminous pattern emission means there are nevertheless numerous project aspects on which it is possible to intervene that influence the perception of each pattern by the human eye, above all taking into consideration the physiological features thereof.

Numerous studies exist that study the physiological features of the human eye and the response thereof to, for example, perceived luminous intensity, as in [1], or to colour as in [2], and which provide information about the luminous intensity or the ideal colour that are easily perceptible, consequently reducing the visual fatigue to the user.

Nevertheless, despite the aforesaid studies and the ideal parameters indicated therein that take account of the physiological features of the human eye, it is not possible to design the reading apparatus accordingly and, for example, set as a design specification for the reading apparatus an emitted intensity of the luminous aiming pattern that is equal to the ideal intensity. The reason lies in the fact that the perception of the aiming pattern, or of the reading outcome pattern, is also influenced by the perception of the illuminating pattern, emitted simultaneously to, or in certain applications, emitted in a close temporal relationship to the aiming pattern or to the reading outcome pattern.

Further, the perception of colour and of luminous intensity influence one another and vary, with the same colour and luminous intensity emitted, with the variation of the work distance at which the coded information to be acquired is positioned.

It should be added to what has been said above that a reading apparatus consists of complex optical and electronic components, in which all the design aspects linked, for example to the optics (focal point and numerical opening of the optical system, distance between aperture diaphragm and lens) of a projection device of the aiming pattern and of the reading outcome pattern influence one another and contribute to defining the method with which the emitted luminous patterns are perceived.

In other words, although the luminous intensity emitted by the illuminating device and by the aiming device increase, the illuminating pattern and the resulting aiming pattern might not be easily distinguishable if the corresponding emission colours are not appropriately selected, are not suitably different chromatically and if the coded information to be read is at a non-ideal work distance.

SUMMARY

The object of the present invention is to devise a reading apparatus of coded information that is free of the drawbacks disclosed above, in particular a reading apparatus of coded information that has a visual interface with reduced visual fatigue that is based not only on aesthetic factors but also considers the physiological features of the human eye.

A further object of the present invention is to make available an illuminating pattern, an aiming pattern and a reading outcome pattern in which there is a chromatic difference between the aiming pattern and the illuminating pattern and between the reading outcome pattern and the illuminating pattern that is such that a user perceives without visual fatigue the difference between the different patterns both as a shape and as a colour.

Another object of the present invention is to optimise the perception of the aiming pattern for a user over the entire work range.

These objects and still others are all achieved by a reading apparatus according to one or more of the claims set out below.

BRIEF DESCRIPTION OF THE DRAWINGS

The invention can be better understood and implemented with reference to the attached drawings that illustrate an embodiment thereof by way of non-limiting example, in which.

DETAILED DESCRIPTION OF THE DRAWINGS

Figure 1:
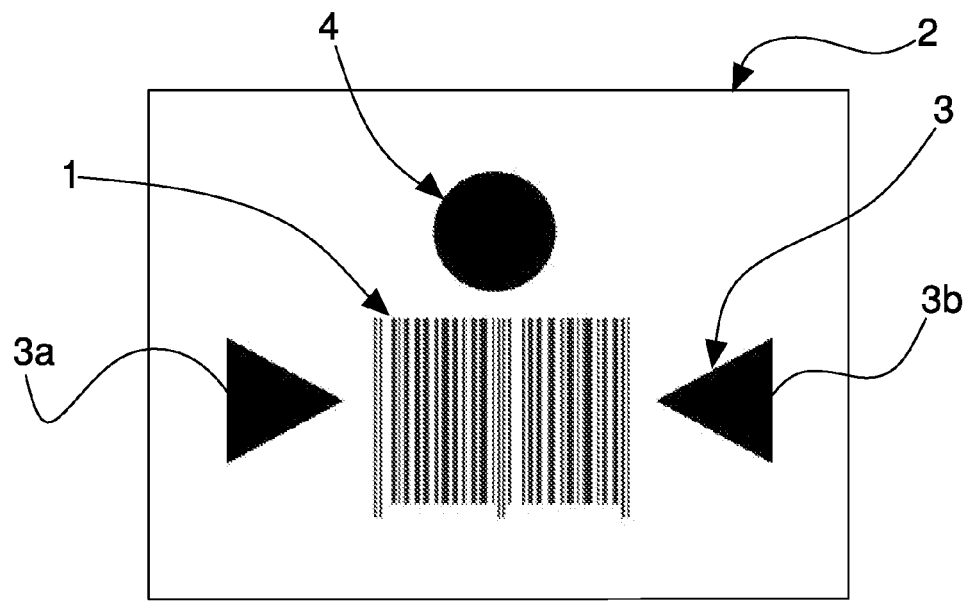
FIG. 1 shows optical information, in particular a barcode, in an object (not shown), to which is in use that is illuminated by a luminous pattern, an aiming pattern and a reading outcome pattern shown as simultaneously active.
Figure 6:
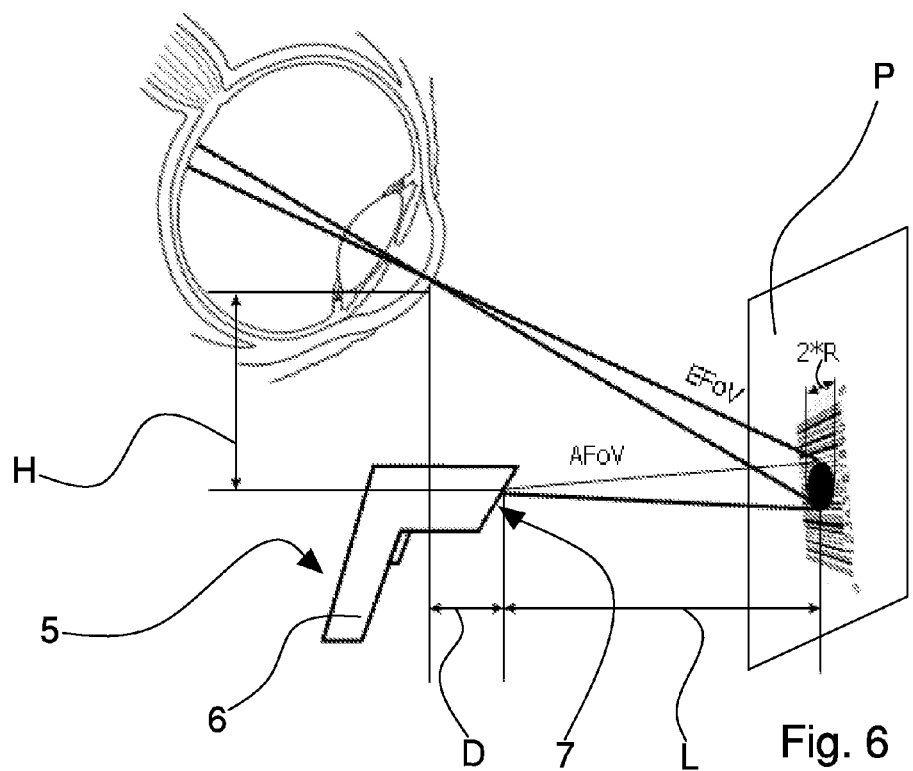
FIG. 6 shows schematically the human Eye Field of View as influenced by the opening of the iris and by the dimension of the framed object, in relation to the field of view framed by aiming means of the apparatus (Aiming Field of View)

With reference to FIG. 1, as already illustrated previously and to which reference is made with no restriction of scope, an illuminating pattern 2, an aiming pattern 3 and a reading outcome pattern 4 are illustrated that define an HMI (Human Machine Interface), as emitted, in use, by a codified information reading apparatus 5, represented schematically in FIG. 6 as a portable device that is holdable by an operator. According to alternative embodiments, the reading apparatus 5 could be a scanner of fixed type. As mentioned previously and not repeated in detail here, the reading apparatus 5 comprises acquisition means (not shown) of the optical information 1 and a body 6 provided with a frontal face 7. The optical information 1 acquisition means comprises image acquisition means.

The coded information 1 lies on a plane P, illustrated in FIG. 6, on which the aiming pattern 3, illuminating pattern 2 and reading outcome pattern 4 are projected.

The work range of the acquisition apparatus corresponds to the depth of field and is considered to be comprised between 0 mm and a maximum work distance, in particular equal to 350 mm, considered from the frontal face 7. Without restricting scope, the maximum work distance could also have a different value.

Nevertheless, for work distances between 0 and 50 mm we consider that the user aims the optical code instinctively, i.e. based on the correspondence between the centre of the front part of the reader and the centre of the barcode and not on the information projected by the HMI. In the work range, there is therefore a significant range of distances for the purposes of the present invention, it being assumed that HMI is actually used by a user within this significant range of distances. This significant range of distances is comprised between a significant minimum distance equal to 50 mm and the maximum work distance, for example 350 mm, inside the depth of field DOF the acquisition apparatus. Below, it will therefore be assumed that the optical information 1 is to be arranged at a distance from the frontal face 7 comprised between the significant minimum work distance, in particular 50 mm, and the maximum work distance, in particular 350 mm, which define the significant work range.

The reading apparatus further comprises illuminating means (not shown) for emitting the illuminating pattern 2 such as to enable the optical information to be acquired 1, aiming means (not shown) for emitting the aiming pattern 3 such as to indicate to a user the field of view of the reading apparatus 5, and indicating means (not shown) for emitting the reading outcome pattern 4 and providing indications to a user relating to the acquisition of the optical information. The illuminating means, the aiming means and the indicating means comprise respective projecting means (not shown) and comprise respective non-coherent light sources (not shown), in particular LED light sources.

According to the invention, the reading apparatus has been designed to optimise the perception of the illuminating pattern 2, of the aiming pattern 3 and of the reading outcome pattern 4 for the human eye in consideration of the physiological properties thereof and in such a manner that such a perception occurs with reduced visual fatigue of the user throughout the significant work range.

In order to respect the physiological properties of the human eye, some design requisites have been laid down that have been chosen out of the many possible ones that affect the perception by a user and which will be listed below.

First of all, a chromatic difference has been considered between the aiming pattern 3 and the illuminating pattern 2 and between the reading outcome pattern 4 and the illuminating pattern 2. It is noted that the aiming pattern 3 and the reading outcome pattern 4 are never lighted simultaneously, given the different function they perform but it is nevertheless assumed that a first requisite is that a user has to perceive the difference between the patterns, at least as a colour.

The luminous intensity of the projected patterns has also been considered, which as is known decreases in the case of a non-coherent light source with the increase of the distance and the relationship thereof with the emission colour, which influences the luminous intensity perceived by the human eye for the same luminous power emitted. As a second requisite, it has been assumed that a user has to perceive the luminous intensity as being ideally constant also with the varying of the distance from the emission face of the apparatus and it has been attempted to come as close as possible to this situation.

One of the requisites of the reading apparatus has been further considered to be a resolution, in the sense of sharpness, of the aiming pattern and/or of the reading outcome pattern and the corresponding dimension emitted thereby.

As a third requisite, the dimension of each emitted luminous pattern has been considered. With regard to the aiming pattern 4, the dimension has been considered of each of the present light portions emitted, which can be one only or a plurality, suitable for forming the aiming pattern 3. In FIG. 1, the aiming pattern 3 is shown by way of example as comprising two triangular portions 3a and 3b and i.e. two equilateral triangles with opposite vertices. If the circumference is considered that inscribes each of these portions and in detail the circumference inscribed inside the equilateral triangle, the ideal dimension of each luminous portion of the aiming pattern 3 is the one that fills the Eye Field Of View (or EFOV) in the entire significant work range, which according to what has been identified by [7] is equal to 2°. On the other hand, with regard to the dimension of the reading outcome pattern 3, the considerations made above are valid, nevertheless, even if this assumption is less stringent for the reading outcome pattern 4 with respect to the aiming pattern 3, as the duration of the emission of this reading outcome pattern 4 is limited and thus the perception thereof is dominated by the luminous intensity and by the colour.

As a fourth requisite, it has been assumed that an ideal apparatus should have an aiming pattern resolution at least equal to 6 cy/degree inasmuch as this resolution corresponds to the clearest perception by the human eye according to what has been identified by [6]. The same assumption has been made for the reading outcome pattern, and it has been assumed that it has a resolution at least equal to 6 cy/degree.

An ideal reading apparatus, even it is provided with a LED aiming device, thus has to have, as said previously, a great chromatic difference between the luminous emitters, invariant luminous intensity with respect to the distance and to the colour, resolution at 6 cy/degree of the aiming pattern 3 and a reading outcome 4 equal to at least 50%, but also a luminous aiming pattern 3 and reading outcome 4 of dimensions that are such that each projected luminous portion fills the optimum human eye field of view in the significant work range.

Starting from the four requisites listed above that the apparatus has to meet, operating parameters of the reading apparatus have been defined with which at least the illuminating means and/or the aiming means and/or the indicating means of the reading apparatus are configurable and for each of these parameters respective permissible values have been selected that influence the behaviour of the reading apparatus with an effect that is detectable by a user during operation of the reading apparatus 5.

The operating parameters are in particular a subset of all the modifiable parameters of the reading apparatus 5. These modifiable parameters relate to optical or electronic components that are part of the reading apparatus 5 and modify the configuration of the reading apparatus 5. The reading apparatus is "configurable" in the sense that a design for a type of component can be chosen from several possible types (for example, one parameter could relate to the lens and/or diaphragm aperture type to be selected, of one type rather than of another type) or because it is possible to vary in use the operation of the reading apparatus 5.

Of the possible modifiable parameters of the apparatus, only some parameters have been identified, named as operating parameters, which according to the invention have been deemed to be able to influence the requisites listed above in order to improve the perception of the aiming pattern 3, of the illuminating pattern 2 and of the reading outcome pattern 4 by a user. These operating parameters are suitable for configuring at least the operation of the illuminating means and/or of the aiming means and/or of the indicating means.

The plurality of these operating parameters comprises the wavelength of each of the non-coherent LED light sources emitting the illuminating pattern 2, the aiming pattern 3 and the reading outcome pattern 4.

The permissible values of the $\lambda$aiming wavelength of the light source of the aiming means are comprised in a range from 430 to 470 nm, in particular preferably 470 nm.

The permissible values of the $\lambda$illuminating wavelength of the light source of the illuminating means are comprised in a range from 590 to 650 nm, in particular preferably 625 nm.

The permissible values of the $\lambda$readingoutcome wavelength of the light source of the indicating means are comprised in a range from 530 to 560 nm, in particular preferably 530 nm.

The permissible values of the $\lambda$aiming, $\lambda$illuminating and $\lambda$readingoutcome wavelengths are such that the perception of the illuminating pattern 2, of the aiming pattern 3 and of the reading outcome pattern 4 is optimum to the human eye in consideration of the physiological properties thereof, i.e. perception occurs with reduced visual fatigue to the user over the entire significant work range.

It is observed that the illuminating means, the aiming means and the indicating means can have three respective distinct light sources for emitting the aiming pattern 3, the reading outcome pattern 4 and the illuminating pattern 2.

Alternatively, the aiming means and the indicating means can have a single common non-coherent light source, for example a multichip LED emitter, for alternatively emitting the aiming pattern 3 or the reading outcome pattern 4. The wavelengths indicated previously still remain valid, i.e. $\lambda$aiming is comprised in the range 430 to 470 nm, in particular preferably 470 nm, whereas $\lambda$readingoutcome is comprised in the range 530 to 560 nm, in particular preferably 530 nm.

Still alternatively, the aiming means and the indicating means can coincide entirely and in this case the aiming pattern 3 and the reading outcome pattern 4 would be alternative but identical, except for the colour emitted, for which reason what was said previously still applies.

Amongst the operating parameters there is further the angular dimension of the Eye Field Of View or EFOV framing a luminous portion, 3a or 3b, of the aiming pattern 3 and/or of the reading outcome pattern 4.

FIG. 6 illustrates an optimum view angle of the human eye, sectioned in a plane parallel to the sagittal plane, and i.e. the angle of view that is influenced by the dimension of the fovea and by the density of distribution of the receptors therein and which enables the maximum resolution to be perceived without fatiguing the view.

If the angular dimension of the eye field of view EFOV framing this luminous portion 3a or 3b at the maximum operating distance is equal to 2°+/−0.4°, and i.e. is comprised in a range comprised between 1.6° and 2.4°, the perception of the luminous portion 3a or 3b of the aiming pattern 3 occurs with reduced visual fatigue to the user over the entire significant work range, and in this way the luminous contrast decrease at the maximum work distance is compensated.

The angular dimension of the eye field of view EFOV can be approximately disclosed by an increasing function, that depends on a distance L from the frontal face 7, preferably a linear function that grows with the distance L, in the significant work range and is comprised between a first and a second straight line that define a plane portion containing the increasing function EFOV.

According to one embodiment, the first straight line is defined by 0.06*L−0.5, the second straight line is defined as 0.02*L+1.7.

Preferably, the first straight line is defined by 0.054*L−0.29, the second straight line is defined as 0.034*L+1.21.

L is the distance in centimeters from the frontal face 7 to the plane P on which the coded information 1 lies and on which the illuminating 2 aiming 3 and reading outcome 4 pattern is projected.

Another operating parameter to be considered is the angular dimension of the Eye Field of View EFOV framing the reading outcome pattern 4. Similar values to those supplied previously are also applicable to the angular dimension of the Eye Field of View of the reading outcome pattern and are not repeated here. Nevertheless, as already said previously, this parameter influences the perception of the reading outcome pattern much less than the intensity and colour thereof and must therefore be considered to be optional. The operating parameters also include the MTF (Modulation Transfer Function) of the aiming means 3, and/or of the reading outcome means 4.

MTF is a parameter used in the state of the art to evaluate and disclose the performance of an optical system. MTF tells us how faithfully an optical projecting (or similarly receiving) system transfers (or reproduces) the detail of the projected (or observed) object onto the projecting plane (image plane) of the system.

It has been said that the aiming means and the indicating means have respective projecting means for emitting the aiming pattern 3 and the reading outcome pattern 4. With MTF an actual measurement is thus supplied respectively of the resolution of the luminous pattern projected by the aiming means and by the indicating means, supplied at 6 cy/degree.

Figure 7:
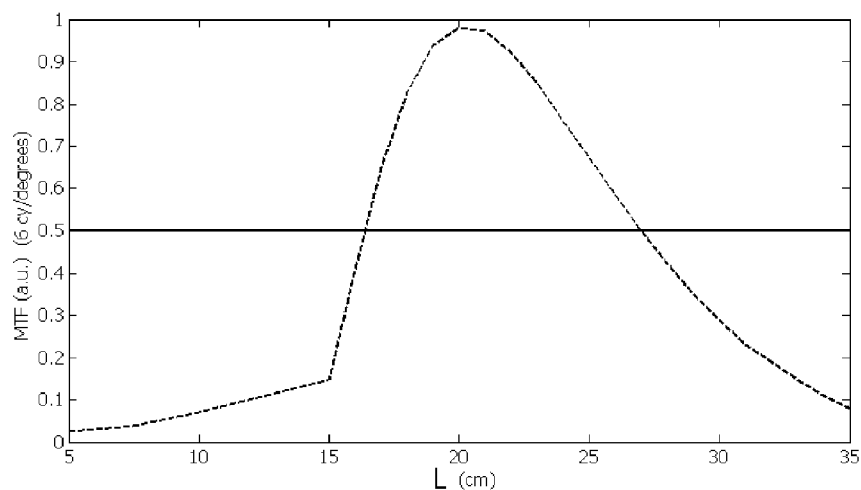
FIG. 7 shows a graph displaying the MTF (Modulation Transfer Function) of aiming means of the apparatus according to the present invention in a significant work range of the reading apparatus.

FIG. 7 illustrates the aiming modulation transfer function MTF values at a frequency of at 6 cy/degree, selected in accordance with the invention in such a manner that the aiming pattern 3 is perceived with reduced visual fatigue to the user over the entire significant work range.

It should be noted that FIG. 7 shows a line at which the MTF of the aiming means is equal to 50% and the corresponding range of distances is within the significant work range, so the MTF is greater than 50%.

In the apparatus of the invention, the perception of the aiming pattern 3 occurs with reduced visual fatigue to the human eye over the entire significant work range if permissible values of the aiming MTF at 6 cy/degree are supplied so that the aiming MTF is greater than 50% in a distance range between 120 and 310 mm, in particular preferably between 163 and 271 mm from the frontal face, and if the aiming MTF preferably has a maximum in a range comprised between 190 and 210 mm, in particular preferably at 200 mm, from the frontal face 7.

On the other hand, as far as the perception of the reading outcome pattern 4 is concerned, it has been found that the perception occurs with reduced visual fatigue to the human eye over the entire significant work range if permissible values of the reading outcome MTF at 6 cy/degree are supplied that are such that the reading outcome MTF is greater than 50% in a distance range between 128 and 324 mm, in particular preferably between 171 and 285 mm from the frontal face, and if preferably the reading outcome MTF has a maximum in a range comprised between 205 and 225 mm, in particular preferably at 215 mm, from the frontal face 7.

If the aiming means and the indicating means provide respective distinct projecting means with respective distinct optical performance, to emit the aiming pattern 3 and the reading outcome pattern 4, the permissible values of the aiming MTF and of the reading outcome MTF are different, as indicated previously.

According to an alternative preferred embodiment of the present invention, the aiming means and the indicating means have optical emitting means in common, or distinct projecting means but with the same optical performance, to emit the aiming pattern 3 and the reading outcome pattern 4. For example, according to a preferred embodiment, the aiming means and the indicating means comprise a light source and projecting means that are shared in common. Or, the aiming means and the indicating means have distinct light sources and distinct projecting means but with the same optical performance. The MTF is thus the same for the aiming means and indicating means and in this case permissible values of the aiming MTF are considered that also apply to the reading outcome MTF. FIG. 7 applies in this case both to the resolution of the aiming pattern 3 and to the resolution of the reading outcome pattern 4.

The permissible λaiming, λilluminating and λreadingoutcome values, aiming and optionally reading outcome EFOV values at the maximum operating distance, and the aiming MTF and reading outcome values at 6 cy/degree over the entire work range are thus selected in such a manner as to "optimise" the perception of the aiming pattern 3 and of the reading outcome pattern 4 that has to occur with reduced visual fatigue to the user over the entire significant work range.

The meaning of the term "optimising" is considered below and for this the formulas will be identified that are defined by the permissible values of each parameter.

The following have been defined:
  a luminous contrasting function, named as VP1, between the aiming pattern 3 and the illuminating pattern 2;
  a colour contrasting function, named as VP2, between the aiming pattern 3 and the illuminating pattern 2 and between the reading outcome pattern 4 and the illuminating pattern 2;
  a dimensioning function, named as VP3, of the aiming pattern 3 and of the reading outcome pattern;
  a resolution function, named as VP4, of the aiming pattern 3 and of the reading outcome pattern,
which together concur to define an objective function VSMF, which can also be called a merit function or target function, to be maximised in order to optimise the perception of the illuminating pattern 2, of the aiming pattern 3 and reading outcome pattern 4 by the human eye in consideration of the physiological properties thereof.

Figure 8:
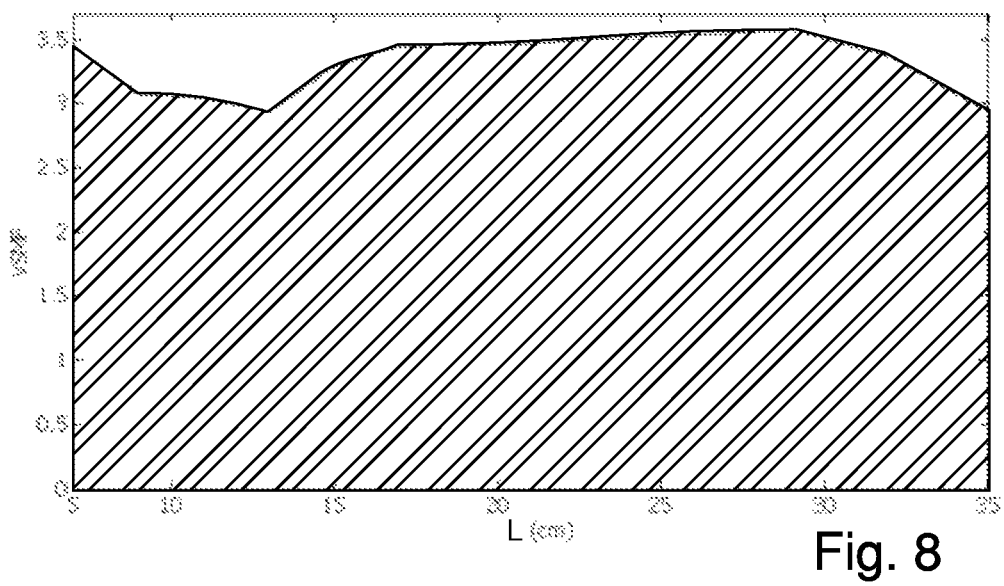
FIG. 8 shows a graph in which an objective function according to the present invention is shown in the significant work range.

The objective function VSMF, as illustrated in FIG. 8, is defined by the following Formula 1 as:

$$VSMF = (VP1)^2 + (VP2)^2 + (VP3)^2 + (VP4)^2 \qquad \text{[Formula 1]}$$

The objective function is "maximised" if the objective function, normalized at 1, has a value above 0.7 (70% of the maximum value thereof) over the entire work range and if, by tracing a graph of the VSMF values in function of the distance, the area under the curve, indicated in FIG. 8, is the maximum possible.

The objective function VSMF depends on the plurality of operating parameters of the apparatus that influence the value of each, of some or of all the VP1 and/or VP2 and/or VP3 and/or VP4 functions that are part of the objective function, which have been formulated, as will be seen below, by taking into account the physiological features of the human eye.

The permissible values of each operating parameter are such that the area under the objective function is maximised and at the same time never falls below 70% of maximum value and thus has a normalized value the same as or greater than 0.7.

Thus if each parameter has values included in the respective range of permissible values, as supplied previously, the perception of the illuminating pattern 2, of the aiming pattern 3 and of the reading outcome pattern 4 is optimum to the human eye over the entire work range, in consideration of the physiological properties thereof and this means that the perception of the luminous pattern is high and with reduced visual fatigue for the user.

In other words, the permissible values of each operating parameter comprise all those values which, considered together with all the other permissible values of the other operating parameters, are such as to maximise not only each VP1, VP2, VP3, or VP4 function individually but also the objective function, with which each function concurs.

In other words, parameter values are not chosen that, for example, maximise only the luminous contrast function VP1, inasmuch as for those values the colour contrast function VP2 could take on a value that is so low as to cause visual fatigue to a user viewing the visual interface.

The operating parameters have been identified inasmuch as they are directly correlated with the requirements of the reading apparatus in order to obtain a great chromatic difference between the luminous emitters, invariant luminous intensity with respect to the distance and colour, optimum resolution for the human eye and a luminous pattern of dimensions such as to fill the optimum field of view of the human eye. The operating parameters intervene directly or indirectly in the formulation of the VP1, VP2, VP3 and VP4 functions of the objective function.

The Luminous Contrast Function VP1

Figure 2:
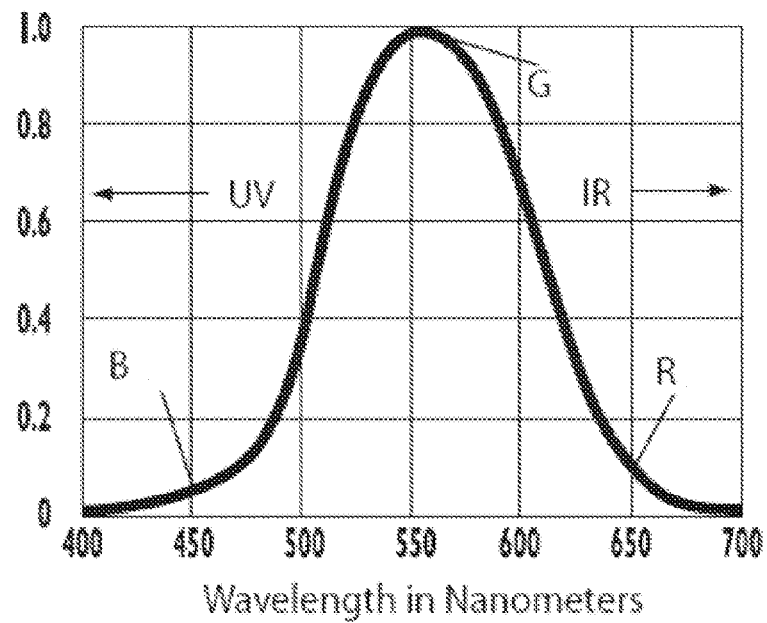
FIG. 2 shows the CIE photopic response curve of the human eye according to [3], as defined by the "Commission Internationale de l'Éclairage" (the international acronym of which is CIE), in which on the x-coordinate the wavelength in nanometers is supplied and on the y-coordinate the average spectral sensitivity of the human eye is shown, and in which the sensitivity of the human eye to the colours blue (B), red (R) and green (G) is shown.

The luminous contrast function VP1 has been defined to consider the fact that the efficacy of the perception by the human eye of two luminous signals depends on the difference in intensity of the signals received, weighted according to the response of the human eye to the respective wavelengths, if the two signals have different wavelengths and thus different colours. The luminous contrast function is thus identified according to the following Formula 2:

$$VP1 = (I_{aiming} - I_{illuminating})/I_{illuminating}; \quad \text{[Formula 2]}$$

in which I is the illuminance of the light source, i.e. the luminous flow per unit of area expressed in LUX and measured on the projection plane P. As is known, the illuminance I corresponds to the irradiance weighted according to the CIE curve, defined by "Commission Internationale de l'Éclairage" (the international acronym of which is CIE), which identifies the photopic response of the eye in function of a wavelength as indicated in [3]. The CIE curve is shown in FIG. 2.

VP1 is normalized at 1 when it is inserted into Formula 1 defining the objective function.

Colour Contrast Function VP2

The colour contrast function VP2 has on the other hand been defined as the sum of two components such as VP2-1 and VP2-2, as according to the following Formula 3:

$$VP2 = VP2\text{-}1 + VP2\text{-}2 \quad \text{[Formula 3]}$$

VP2-1 is a function that optimises the contrast between the colours of the illuminating pattern 2 and of the aiming pattern 3 and between the colours of the illuminating pattern 2 and of the reading outcome pattern 4. VP2-2 is on the other hand a function that maximises the differentiation between receptors and nerve fibres that are used respectively for receiving and transmitting the stimuli induced by the different projected patterns.

First of all, it is pointed out that it is necessary to consider the contrast between the colours of the illuminating pattern 2 and of the aiming pattern 3 inasmuch as the illuminating pattern 2 and the aiming pattern 3, when the coded information is framed, are emitted simultaneously or in a close temporal relationship. Similarly, the contrast between the colours of the illuminating pattern 2 and of the reading outcome pattern 4 must be considered inasmuch as also the illuminating pattern 2 and the reading outcome pattern 4 are emitted simultaneously or in a close temporal relationship when it is necessary to supply a reading outcome indication to a user.

Further, there also needs to be a contrast between the colours of the aiming pattern 3 and the reading outcome pattern 4 so that a user can easily identify the one from the other, even if the contrast between these colours may be less than the contrast with the illuminating pattern 2 inasmuch as the aiming pattern 3 and the reading outcome pattern 4 are emitted at different moments, the former before the latter.

The colour of the emitted reading outcome pattern 4 is usually green by convention and this colour has been retained as a system requisite.

Figure 3:
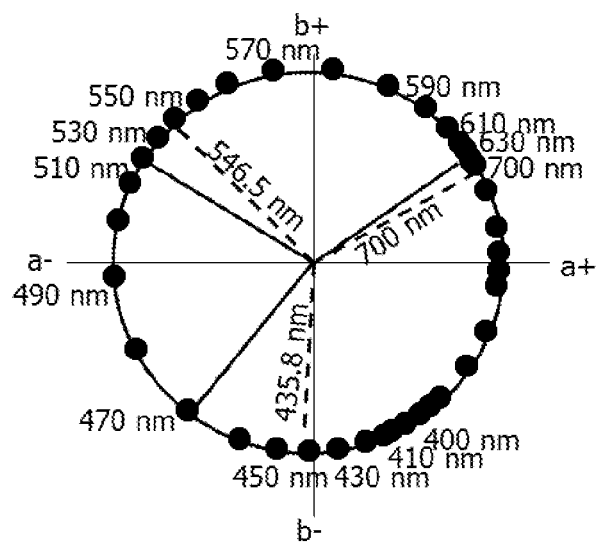
FIG. 3 shows the "1931 CIE Color Map", or the "CIECAM ab plane" map of circular perception of colours according to [4], in which the wavelength is indicated of the different colours making up the map and in which with a dashed line the ideal wavelengths are indicated for the purpose of differentiating specialised nerve fibres receiving and conveying colour information to the cerebral cortex and with a continuous line the wavelengths are identified for the purposes of the present invention.

If the circular CIE map in FIG. 3 is considered that is named CIECAM ab and maps perception of colours according to what is illustrated in [4], the best perception between two different colours is the greater the more the angle $\alpha$ between the colours positioned on the map tends to 180°. The best contrast according to [4] is obtained when two colours are positioned on the map at an angle $\alpha$ of 180° from one another. However, this would mean assigning only two colours to the luminous patterns, i.e. a green colour for the reading outcome pattern and the aiming pattern and a colour opposite green for the illuminating pattern.

However, if it is wished to select three different colours for the luminous patterns and not two because it is convenient to have a colour contrast between all the luminous patterns, the function VP2-1 optimising the contrast between the colours of the illuminating pattern and of the aiming pattern and between the colours of the illuminating pattern and of the reading outcome pattern has been defined inside the colour contrast map [4] in such a manner that:

$\alpha 1$(between aiming pattern and illuminating pattern) =1.5$\alpha$2(between reading outcome pattern and illuminating pattern)=2$\alpha$3(between aiming pattern and reading outcome pattern).

It is pointed out that $\alpha 1$, $\alpha 2$, and $\alpha 3$ are given as angle differences between colours positioned on the circular map CIECAM ab of [4]. The function VP2-1 is defined according to the following Formula 4:

$$VP2\text{-}1 = \text{minimum}[\alpha 1; 1.5*\alpha 2; 2*\alpha 3] \text{ from which it follows that:} \quad \text{[Formula 4]}$$

$\alpha 1$ (between aiming pattern and illuminating pattern)=166°;

α2 (between reading outcome pattern and illuminating pattern)=110°;
α3 (between aiming pattern and reading outcome pattern) =83°.
VP2-1=166°

In other words, the colour contrast has been assigned using different weights between the different luminous patterns, in particular a colour contrast between the aiming pattern 3 and the reading outcome pattern 4 has been deemed to be acceptable that is less than other values inasmuch as the aiming pattern 3 and the reading outcome pattern 4, as already said previously, are never emitted simultaneously. Further, a colour contrast between the reading outcome pattern 4 and the illuminating pattern 2 has been deemed to be acceptable that is less than that between the aiming pattern 3 and the illuminating pattern 2 inasmuch as the reading outcome pattern 4 is generally observed for a noticeably shorter time than is the case with the aiming pattern 3 and thus influences visual fatigue less.

On the other hand, with regard to the function VP2-2, we started with considerations linked to the fact that the retina comprises three distinct receptors, namely the L, M and S cones. The L cones have maximum absorption of wavelengths comprised between 400 and 500 nm and i.e. in the red, the M cones are sensitive to intermediate wavelengths, i.e. to green, the S cones are on the other hand sensitive to greater wavelengths, i.e. blue. Following excitation of one or more of these L, M and S receptors in the retina, the perception of colours reaches the cerebral cortex via specialised receptor and transport nerve fibres or channels, of a different type, a first type of which conveys the difference between the nerve stimuli from the red and green L and M, cones whilst a second type conveys the difference between the nerve stimuli from the blue S cones, and a combined signal of the red and green L and M cones, as described in [2], [5] and [8].

Figure 4:
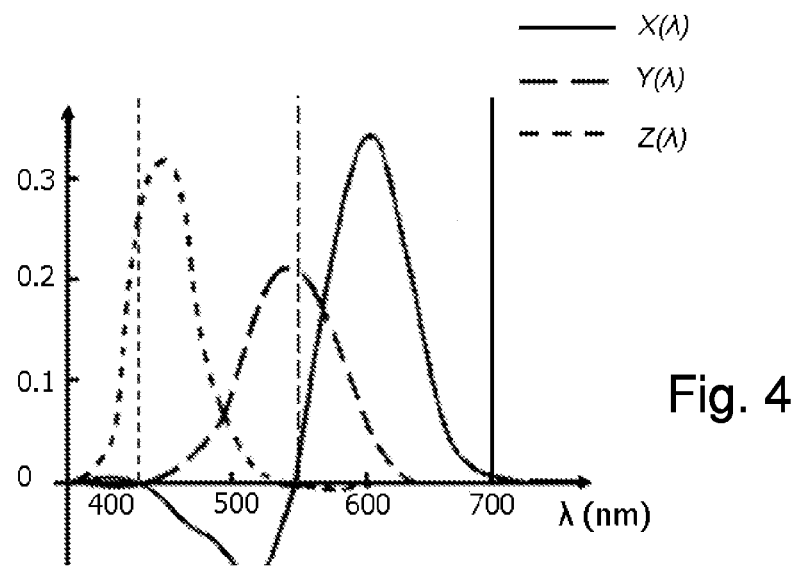
FIG. 4 shows the "1931 CIE RGB Color Matching Functions", or the Colorimetry map defined in 1931 that shows the curves x, y, and z defined by CIE 1931 as according to [5] to approximate the response function respectively of the L, M and S cones present in the retina and in which wavelengths are indicated that are deemed to be suitable for differentiating specialised nerve fibres receiving and conveying colour information to the cerebral cortex between the illuminating, aiming and reading outcome pattern light sources.
Figure 5:
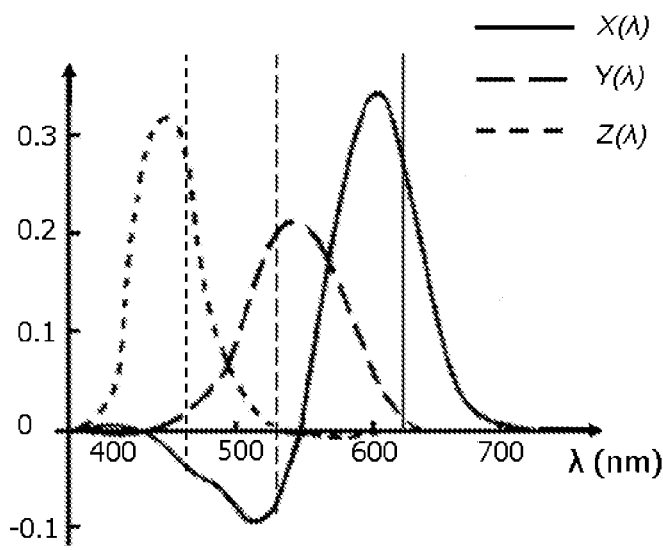
FIG. 5 shows the "1931 CIE Color Matching Functions", which is similar to that of FIG. 4, in which the wavelengths selected for the purposes of the present invention are shown.

The curves x, y, and z shown in FIGS. 4 and 5 are defined by CIE 1931 and approximate the spectral response function for a field of view of 2° respectively of the L, M and S cones found in the retina on the different wavelengths and thus respectively the response to the colour red, indicated with a continuous line, green indicated with a line of long dashes and blue, indicated with a line of short dashes.

Considering the curves x, y, and z of FIG. 4, in consideration of the efficiency of use of the specialised nerve fibres and if it is considered that a colour has to be chosen for the aiming pattern 3, for the illuminating pattern 2 and for the reading outcome pattern 4, choosing wavelengths for each colour that are able to excite only one of the receptors of the retinas but not the other two and using different nerve fibres to convey the visual stimulus to the cerebral cortex could be initially assumed.

For example, on the 700 nm wavelength, indicated with the continuous line, only the L cone is excited, on the 546.5 nm wavelength, indicated by a line of long dashes, only the M cone is excited, on the 435.8 nm wavelength, indicated with a line of short dashes, only the S cone is excited.

If, for example, a green reading outcome pattern 4 were selected on the 546.5 nm wavelength, a blue aiming pattern 3 were selected on the 435.8 wavelength and an illuminating pattern 2 were selected on the 700 nm wavelength, the ideal condition hypothesised previously would be met.

The ideal wavelengths for the luminous patterns equal to 546.5 nm, to 435.8 nm and 700 nm, are shown as dashed lines in FIG. 3.

The function VP2-2 has been identified as indicated in Formula 5 below, to consider the features of the retina receptors and the use of the nerve fibres that convey the nerve stimulus:

$$VP2\text{-}2 = \text{minimum value}[x(\lambda\text{illuminating})/(y(\lambda\text{illuminating})+z(\lambda\text{illuminating})); z(\lambda\text{aiming})/(x(\lambda\text{aiming})+y(\lambda\text{aiming})); y(\lambda\text{readingoutcome})/(x(\lambda\text{readingoutcome})+z(\lambda\text{readingoutcome}))],$$ [Formula 5]

VP2-2 can also ideally assume the value ∞. In order to avoid this, a maximum threshold value for VP2-2 has been set. In other words, if VP2-2 has a greater value than 10, VP2-2 is assigned a value of 10.

The preferred wavelengths of the permissible λaiming, λilluminating and λreadingoutcome values according to the present invention, indicated in FIG. 5, are nevertheless different from the previously hypothesised ideal condition. It is observed that λaiming has the preferable value 470 nm, which corresponds to the blue value indicated by the line of short dashes, λilluminating has the preferable value 625 nm, which corresponds to the red colour indicated with a continuous line and λreadingoutcome has the preferable value 530 nm, which corresponds to the green colour indicated with the line of long dashes.

The same wavelengths are also shown as a continuous line in FIG. 3.

The wavelengths selected for the purposes of the present invention are not those identified as ideal for the purposes of the colour contrast, i.e. identified as being able to excite different receptors of the retina and different nerve fibres, but are those that optimise the entire objective function over the entire work range and simultaneously try to assume colours that are as near as possible to the ideal condition for the colour contrast.

By replacing VP2-1, indicated in Formula 4, in the final formula disclosing VP2 given by the preceding Formula 3, and by replacing VP2-2, indicated in Formula 5, VP2-1 and VP2-2 being respectively standardised to 1, VP2 is obtained as the following Formula 6:

$$VP2=(VP2\text{-}1/166)+(VP2\text{-}2/10)$$ [Formula 6]

The Dimensioning Function VP3

The dimensioning function is applied to the aiming pattern and optionally, for the reasons indicated previously, to the reading outcome pattern. The dimension of each luminous portion of the aiming pattern 3 or of the reading outcome pattern 4 is defined that fills the optimum field of view of the human eye, which is 2° [7], is defined as VP3. The VP3 for the aiming pattern 3 is defined below but the same formula also applies to the reading outcome pattern 4 and is not repeated below.

The aiming pattern 3 comprises one or more distinct luminous portions that is suitable for indicating to the user, at the various reading distances, the optimal zone in which to position the optical information. Considering each luminous portion considered projected onto a plane P on which the coded information to be read lies and assuming that the reader, as shown in FIG. 6, has his own acquisition means frontal to this plane P, so that it is possible to define a:

circumference that inscribes the luminous portion having a radius "R" and diameter 2*R and if the projected aiming pattern 3 comprises two triangles, in particular equilateral triangles, the circumference is on the other hand preferably inscribed within the projected equilateral triangle;

distance "L" between the frontal face 7 of the reading apparatus and the plane P, measured along a line perpendicular to this plane P and passing through the acquisition means of the apparatus;

distance "D" between the frontal face 7 and the intersection of the vertical from the iris of the human eye of the user and the line perpendicular to the plane P and passing through the acquisition means of the apparatus, measured along this line;

distance "H" between the iris of the human eye of the user and the line perpendicular to the plane P and passing through the acquisition means of the apparatus.

It has been said that the ideal dimension of each luminous portion of the aiming pattern 3 is the dimension that fills the optimum eye field of view or EFOV of the human eye over the entire work range. AFOV, the Aiming Field of View, on the other hand indicates the angular dimension of the cone of the projected aiming pattern 3, as framed by the aiming means of the reading apparatus 5 over the entire significant work range. If instead of the aiming pattern 3 the reading outcome pattern 4 is considered, AFOV is the angular dimension of the cone of the projected reading outcome pattern 4, as framed by the indicating means of the reading apparatus 5.

The dimensioning function of the aiming pattern VP3, or of the reading outcome pattern 3, is thus identified by the EFOV, which is obtainable as a function of the variables defined previously according to the following Formula 7:

$$\text{tangent}(EFOV) \cong \frac{2R}{\sqrt{(L+D)^2 + H^2}} = \frac{(L)*\text{tangente}(AFOV)}{\sqrt{(L+D)^2 + H^2}}$$  [Formula 7]

It is first of all assumed that H is $\geq 0$, that L is $\geq 0$, that D is $\geq 0$ and in particular it is assumed that H=450 mm and D=100 mm. H and D values that are different from the values assumed here, in particular comprised between 300 and 510 for H and between 70 and 210 for D, do nevertheless not bring significant deviations in the final result.

The aiming EFOV is thus obtainable as the arctangent of the Function 7, if AFOV refers to the aiming pattern 3.

The reading outcome EFOV is thus obtainable as the arctangent of the function 7, if AFOV refers to the reading outcome pattern 4.

Resolution Function VP4

MTF emitted at 6 cy/degree, as indicated in [6] has been chosen as the resolution measurement.

The dimensioning function VP4 has been defined as equal to the sum of two components such as VP4-1 and VP4-2, as according to the following Formula 8:

$$VP4=0.5*VP4\text{-}1+0.5*VP4\text{-}2$$  [Formula 8]

VP4-1 is a function that optimises dimensioning of the aiming pattern 3, whilst VP4-2 is a function that optimises dimensioning of the reading outcome pattern 4.

Each resolution function VP4-1 or VP4-2 is defined according to the following Formula 9, that applies both to VP4-1 and to VP4-2, which has to be fulfilled over the entire significant work range:

If $MTF$ at 6 cy/degree$\leq$50% it follows that$\rightarrow VP4=MTF$ at 6 cy/degree If $MTF$ at 6 cy/degree$\geq$50% it follows that$\rightarrow VP4=1$  [Formula 9]

The MTF indicated in Formula 9 is the aiming MTF for VP4-1 and the reading outcome MTF for VP4-2

Each VP41-1 and VP4-2 is normalized at 1 when inserted into the Formula 9.

If the aiming means and the indicating means have respective distinct projecting means with different MTFs, the aiming VP4-1 and the reading outcome VP4-2 are different. If, on the other hand, the projecting means is common, then the MTFs coincide and thus VP4-1 is the same as VP4-2. In this case, the dimensioning function VP4 becomes as the following Formula 10:

$$VP4=VP4\text{-}1$$  [Formula 10]

VP4 is normalized at 1 when inserted into the Formula 1 defining the objective function.

The Objective Function and the Permissible Values of the Parameters

After defining each of the functions VP1, VP2, VP3 and VP4 and thus after defining the objective function by the Formula 1, and after identifying the operating parameters, the permissible values are determined that were supplied previously for each operating parameter, resolving the objective function.

The resolution of the objective function is obtained by known software for simulating and designing optical and illuminating systems, such as Zemax® marketed by Radiant Zemax, that enables all the constructional and design features of the reading apparatus to be considered, i.e. all the possible modifiable parameters of the apparatus and not solely the operating parameters.

Even if only the operating parameters intervene in the definition of the objective function, all the remaining modifiable parameters configure the reading apparatus for the specific use applications and determine the actual method of emitting the aiming 3, the illuminating 2 and the reading outcome 4 pattern in relation to possible theoretical emission values.

Purely by way of non limiting example, such construction configuration features of a reading apparatus 5 are listed below that are parameters configured at a value defined at the moment of the identification of the operating parameters:

luminous aiming and/or illuminating flow, for example respectively chosen of 1100 and 13400 Lumen;

angular emission of each light source, for example the angle of view of the aiming and reading outcome source is equal to 20°; the angle of view of the illuminator source is equal to 120';

optical parameters of the emitting and/or projecting means of the aiming pattern and/or of the reading outcome pattern and/or illuminating pattern if it is present as:

the focal position of the lens traversed by the aiming and/or reading outcome and/or illuminating pattern, for example equal to 16.5 f number of the lens traversed by the aiming pattern and/or the illuminating pattern, for example equal to 41;

distance between the source of the luminous aiming pattern and aperture diaphragm of the optical aiming system, for example equal to 2 mm;

distance between the aperture diaphragm of the aiming optical system and the aiming lens, for example equal to 16.45 mm.

By means of the Zemax simulator, it is thus possible to calculate for each distance comprised in the significant work range, for example at each cm, the value of each function VP1, VP2, VP3 and VP4, and this calculation supplies the actual response of the reading apparatus, i.e. the aiming 3, illuminating 2 and reading outcome 4 pattern as actually projected, considering the respective selected sources and the optical components traversed by the emitted pattern.

It is pointed out that the Zemax simulation software is helpful but is not necessary for the purposes of the present invention, inasmuch as it is possible to solve the objective function also exclusively with mathematical calculations, possibly corrected by parameters that consider the configuration of the optics of the reading apparatus 5.

In use, the reading apparatus 5, which was configured at the moment of creation by operating parameters that are part of the permissible values, emits a luminous aiming 3, illuminating 2 and reading outcome 4 pattern, for example on the previously selected λaiming, λilluminating and λreadingoutcome wavelengths, such as to be easily visible to a user, even after a long period of use.

Owing to the invention, it is in fact possible to devise a reading apparatus 5 that does not cause fatigue in perceiving the aiming pattern 3, the illuminating pattern 2 and the reading outcome pattern 4 over the entire significant work range, as the very perception by the human eye that has been considered from several points of view. Four design requisites have been identified from amongst all those that affect perception by a user and for these design requirements certain ideal requisites have been analysed of a reading apparatus with emitting means having at least one LED source, i.e. having a great chromatic difference between the luminous emitters and invariant luminous intensity with respect to distance and colour, resolution equal to 6 cy/degree, and a luminous aiming pattern of dimensions such as to fill the optimum human eye field of view.

In relation to these ideal requisites, certain parameters have been identified from amongst all the modifiable parameters of the reading apparatus that are deemed to be able to influence directly the perception by a user and by means of which at least the illuminating means and/or the aiming means and/or said indicating means are configurable. For these parameters, which are known as operating parameters, permissible values have been selected, but each parameter has not been considered on its own in determining the permissible values. All the operating parameters are in fact considered simultaneously to ensure that all design requisites are met, certainly not in the ideal conditions of each requisite but in the best possible condition considering all the requisites jointly.

Owing to the invention it has thus been possible to assign a blue colour to the aiming pattern, red to the illuminating pattern and green to the reading outcome pattern of set emission wavelengths that derive from the permissible λaiming, λilluminating and λreading outcome values that are able to ensure reduced visual fatigue for the user and high perception over the entire work range. On the identified wavelengths, at least the luminous contrast and the colour contrast between luminous patterns is optimised. Similarly, the dimension of the optimal projected aiming pattern and the best resolution thereof have been determined, compatibly with all the other operating parameters and considering the optical and physiological features of the field of view of the human eye.

REFERENCES

[1] "The visual discrimination of intensity and the Weber-Fechner law", Selig Hecht, The Journal of General Physiology 1924;

[2] M. H. Kim, T. Weyrich, J. Kautz, Modeling Human Color Perception under Extended Luminance Levels, Proceedings ACM SIGGRAPH 2009, pages 27:1-27:9, August 2009

[3] Sharpe, L. T.; Stockman, A.; Jagla, W.; Jagle, H. (2005). "*A luminous efficiency function, V\*(λ), for daylight adaptation*" Journal of Vision 5 (11): 948-968;

[4] Schanda, János (2007). "The Future of Colorimetry in the CIE: Color Appearance". *Colorimetry: Understanding the CIE System*. Wiley Interscience. p. 359. ISBN 978-0-470-04904-4;

[5] G. Osterberg (1935). "Topography of the layer of rods and cones in the human retina," Acta Ophthalmol., Suppl. 13:6, pp. 1-102;

[6] SPIE Proceedings Vol. 5187: pp. 294-300. 2004. V. Ramamurthy et al.;

[7] D. Sagi & B. Julesz, Spatial vision, vol. 2, No. 1 pp. 39-49 (1987);

[8] Hering E, 1964. Outlines of a Theory of the Light Sense. Harvard University Press, Cambridge, Mass.

The invention claimed is:

1. An apparatus for reading optical information comprising:
   acquisition means for acquiring said optical information;
   a body provided with a frontal face from which said optical information is to be arranged at a distance comprised between a minimum significant work distance, and a maximum work distance, defining a significant work range;
   illuminating means for emitting an illuminating pattern so as to permit said acquisition of said optical information;
   aiming means for emitting an aiming pattern so as to indicate to a user a field of view of said reading apparatus;
   indicating means for emitting a reading apparatus outcome pattern so as to supply indications to a user relating to said acquisition of said optical information;
   said illuminating means, said aiming means and said indicating means comprising respective non-coherent light sources, and in which, for said reading apparatus, at least said illuminating means and/or said aiming means and/or said indicating means are configurable by a plurality of operating parameters, for each of which respective permissible values are selectable, that is able to influence the behaviour of said reading apparatus with an effect that is detectable by said user during operation of the reading apparatus;
   and wherein said plurality of operating parameters comprises the wavelength of each of said light sources, the permissible values of said wavelength of said source of said aiming means being comprised in a range from 430 to 470 nm;
   the permissible values of said wavelength of said source of said illuminating means being comprised in a range from 590 to 650 nm;
   the permissible values of said wavelength of said source of said indicating means being comprised in a range from 530 to 560 nm, said permissible values of said wavelengths being such that the perception of said illuminating pattern, of said aiming pattern and of said reading outcome pattern is optimum to the human eye in consideration of the physiological properties thereof, said perception occurring with reduced visual fatigue to said user over all said significant work range.

2. The apparatus according to claim 1, wherein said wavelength of said source of said aiming means is preferably equal to 470 nm.

3. The apparatus according to claim 1, wherein said wavelength of said source of said illuminating means is preferably equal to 625 nm.

4. The apparatus according to claim 1, wherein said wavelength of said source of said reading outcome means is preferably equal to 530 nm.

5. The apparatus according to claim 1, wherein said aiming means, said indicating means and said illuminating means have distinct light sources for emitting respectively said aiming pattern, said reading outcome pattern and said illuminating pattern.

6. The apparatus according to claim 1, wherein said aiming means and said indicating means have a single common non-coherent light source that is configurable for alternatively emitting said aiming pattern on the wavelength comprised in the range 430 to 470 nm, or said reading outcome pattern on the wavelength comprised in the range 530 to 560 nm.

7. The apparatus according to claim 1, wherein said aiming pattern and/or reading outcome pattern comprises at least one respective luminous aiming portion and/or reading outcome pattern; and wherein said plurality of said operating parameters comprise an angular dimension of the eye field of view (EFOV) framing said luminous aiming portion and/or an angular dimension of the eye field of view (EFOV) framing said luminous reading outcome portion, and wherein if said angular dimension of the aiming and/or reading outcome eye field of view (EFOV), is comprised in a range between 1.6° and 2.4° at the maximum operating distance, said perception of said aiming pattern and/or of said reading outcome pattern occurs with reduced visual fatigue to said user over all said significant work range.

8. The apparatus according to claim 7, wherein said angular dimension of the eye field of view (EFOV) is equal to 2° at the maximum operating distance.

9. The apparatus according to claim 7, wherein said angular dimension of the eye field of view (EFOV) is an increasing function depending on the distance from said frontal face in said significant work range, comprised between a first and a second straight line, the first straight line being defined by 0.06*L−0.5, the second straight line being defined as 0.02*L+1.7, wherein L is the distance from said frontal face.

10. The apparatus according to claim 7, wherein said angular dimension of the eye field of view (EFOV) is an increasing function depending on the distance from said frontal face in said significant work range, comprised between a first and a second straight line, the first straight line being defined by 0.054L−0.29, the second straight line being defined as 0.034*L+1.21, wherein L is the distance from said frontal face.

11. The apparatus according to claim 1, wherein said aiming means and said indicating means comprise respective distinct projecting means having respective distinct optical performance for emitting said aiming pattern and said reading outcome pattern.

12. The apparatus according to claim 11, wherein said plurality of operating parameters comprises a 6 cy/degree aiming modulation transfer function (MTF), permissible values of said aiming modulation transfer function (MTF) are such that if said aiming modulation transfer function (MTF) is greater than 50% in a distance range comprised between 120 and 310 mm from said frontal face, said perception of said aiming pattern occurs with reduced visual fatigue to said user over all said significant work range.

13. The apparatus according to claim 12, wherein said modulation transfer function (MTF) is greater than 50% in a distance range comprised between 163 and 271 mm from said frontal face.

14. The apparatus according to claim 11, wherein said plurality of operating parameters comprises a 6 cy/degree reading outcome modulation transfer function, permissible values of said reading outcome modulation transfer function are such that if said reading outcome modulation transfer function is greater than 50% in a distance range between 128 and 324 mm from said frontal face, said perception of said reading outcome pattern occurs with reduced visual fatigue to said user over all said significant work range.

15. The apparatus according to claim 14, wherein if said reading outcome modulation transfer function (MTF) has a maximum in a range comprised between 205 and 225 mm from said frontal face, said perception of said reading outcome pattern occurs with reduced visual fatigue to said user over all said significant work range.

16. The apparatus according to claim 12, wherein if said modulation transfer function (MTF) has a maximum in a range comprised between 190 and 210 mm from said frontal face, said perception of said aiming pattern occurs with reduced visual fatigue to said user over all said significant work range.

17. The apparatus according to claim 12, wherein said modulation transfer function (MTF) has a maximum preferably at 200 mm from said frontal face.

18. The apparatus according to claim 1, wherein said aiming means and said indicating means comprise common projecting means or respective distinct projecting means having the same optical performance, for emitting said aiming pattern and said reading outcome pattern, wherein said plurality of operating parameters comprises a modulation transfer function (MTF) at 6 cy/degree of said common projecting means, permissible values of said modulation transfer function (MTF) are such that if said modulation transfer function (MTF) is greater than 50% in a distance range comprised between 120 and 310 mm, from said frontal face, said perception of said aiming pattern and of said reading outcome pattern occurs with reduced visual fatigue to said user over all said significant work range.

19. The apparatus according to claim 18, wherein said modulation transfer function (MTF) has a maximum in a range comprised between 190 and 210 mm from said frontal face.

20. The apparatus according to claim 1, wherein a luminous contrast function between said aiming pattern and said illuminating pattern is definable; a colour contrast function between said aiming pattern and said illuminating pattern and between said reading outcome pattern and said illuminating pattern is definable; a dimensioning function of said aiming pattern and of said reading outcome pattern is definable; a resolution function of said aiming pattern and of said reading outcome pattern is definable, which together concur to define an objective function, depending on said plurality of operating parameters, which is maximisable for all the permissible values of said operating parameters, such that said perception occurs with reduced visual fatigue to said user over all said significant work range.

21. The apparatus according to claim 20, wherein said objective function is normalized at 1 and wherein it assumes values above 0.7 for all the permissible values of said operating parameters over all said significant work range.

22. A method for reading optical information in an object by a reading apparatus including a frontal face, wherein said method comprises:

acquiring said optical information, the latter being arranged at a distance from said frontal face comprised between a minimum significant work distance, and a maximum work distance, defining a significant work range;

emitting an illuminating pattern, so as to permit said acquisition of said optical information;

emitting an aiming pattern, so as to indicate to a user a field of view of said apparatus;

emitting a reading outcome pattern, so as to supply indications to a user relating to said acquisition of said optical information;

configuring at least said illuminating means and/or said aiming means and/or said indicating means by a plurality of operating parameters and selecting for each of said operating parameters respectively permissible values that are able to influence the behaviour of said reading apparatus with an effect that is detectable by said user during operation of the reading apparatus; and wherein said plurality of operating parameters comprises the wavelengths of respective non-coherent light sources that are so as to emit respectively said aiming pattern, said illuminating pattern and said reading outcome pattern, permissible values of said wavelength of said source of said aiming means being comprised in a range from 430 to 470 nm;

permissible values of said wavelength of said source of said illuminating means being comprised in a range from 590 to 650 nm;

permissible values of said wavelength of said source of said indicating means being comprised in a range from 530 to 560 nm, said permissible values of said wavelengths being such that the perception of said illuminating pattern, of said aiming pattern and of said reading outcome pattern is optimum for the human eye in consideration of the physiological properties thereof, said perception occurring with reduced visual fatigue to said user over all said work range.

23. The method according to claim 22, and comprising selecting preferably said wavelength of said source of said aiming means as equal to 470 nm.

24. The method according to claim 22, and comprising selecting preferably said wavelength of said source of said illuminating means as equal to 625 nm.

25. The method according to claim 22, and comprising selecting preferably said wavelength of said source of said reading outcome means as equal to 530 nm.

26. The method according to claim 22, and comprising providing distinct light sources for said illuminating means, aiming means and indicating means for emitting respectively said aiming pattern, said reading outcome pattern and said illuminating pattern.

27. The method according to claim 22, and comprising providing a single common light source for said aiming means and indicating means and configuring said common light source for alternatively emitting said aiming pattern on the wavelength comprised in the range 430 to 470 nm, or said reading outcome pattern on the wavelength comprised in the range 530 to 560 nm.

28. The method according to claim 22, wherein said emitting said aiming pattern and/or said reading outcome pattern comprises emitting a luminous aiming portion and said plurality of said operating parameters comprises an angular dimension of the eye field of view (EFOV) framing said luminous aiming portion and/or said luminous reading outcome portion, and wherein if said angular dimension of the aiming and/or reading outcome pattern eye field of view (EFOV) is comprised in a range between 1.6° and 2.4° at the maximum operating distance, said perception of said aiming pattern and/or of said reading outcome occurs with reduced visual fatigue to said user over all said significant work range.

29. The method according to claim 28, wherein said angular dimension of the eye field of view (EFOV) is an increasing function depending on the distance from said frontal face in said significant work range, comprised between a first and a second straight line, the first straight line being defined by 0.06*L−0.5, the second straight line being defined as 0.02*L+1.7, wherein L is the distance from said frontal face.

30. The method according to claim 28, wherein said dimension of the eye field of view (EFOV) is an increasing function depending on the distance from said frontal face in said significant work range, comprised between a first and a second straight line, the first straight line being defined by 0.054L−0.29, the second straight line being defined as 0.034*L+1.21, wherein L is the distance from said frontal face.

31. The method according to claim 22, and comprising providing respective distinct projecting means having respective distinct optical performance for emitting said aiming pattern and said reading outcome pattern.

32. The method according to claim 31, wherein said plurality of operating parameters comprises a 6 cy/degree aiming modulation transfer function (MTF), and wherein said method comprises selecting permissible values of said aiming modulation transfer function (MTF) such that if said aiming modulation transfer function (MTF) is greater than 50% in a distance range comprised between 120 and 310 mm from said frontal face, and if said aiming modulation transfer function (MTF) has a maximum in a range comprised between 190 and 210 mm from said frontal face, said perception of said aiming pattern occurs with reduced visual fatigue to said user over all said significant work range.

33. The method according to claim 31, wherein said plurality of operating parameters comprises a reading outcome modulation transfer function at 6 cy/degree, and wherein said method comprises selecting permissible values of said reading outcome modulation transfer function so that if said reading outcome modulation transfer function is greater than 50% in a distance range between 128 and 324 mm from said frontal face, and if said reading outcome modulation transfer function has a maximum in a range comprised between 205 and 225 mm from said frontal face, said perception of said reading outcome pattern occurs with reduced visual fatigue to said user over all said significant work range.

34. The method according to claim 22, and comprising providing common projecting means or respective distinct projecting means having the same optical performance, for emitting said aiming pattern and said reading outcome pattern, wherein said plurality of operating parameters comprises a 6 cy/degree aiming or reading outcome modulation transfer function (MTF), and wherein said method comprises selecting permissible values of said modulation transfer function (MTF) such that if said modulation transfer function (MTF) is greater than 50% in a distance range comprised between 120 and 310 mm from said frontal face, and if said modulation transfer function (MTF) has a maximum in a range comprised between 190 and 210 mm from said frontal face, said perception of said aiming pattern or of said reading outcome pattern occurs with reduced visual fatigue to said user over all said significant work range.

35. The method according to claim 22, and comprising defining a luminous contrast function between said aiming pattern and said illuminating pattern, a colour contrast function between said aiming pattern and said illuminating pattern and between said reading outcome pattern and said illuminating pattern, a dimensioning function of said aiming pattern and of said reading outcome pattern, a resolution function of said aiming pattern and of said reading outcome pattern, which together concur to define an objective function depending on said plurality of operating parameters; maximising said objective function for all the permissible values of said operating parameters, such that said perception occurs with reduced visual fatigue to the human eye over all said significant work range.

36. The method according to claim 35, and comprising standardising at 1 said objective function that assumes values above 0.7 for all the permissible values of said operating parameters over all said significant work range.

37. An apparatus for reading optical information comprising:
acquisition means for acquiring said optical information;
a body provided with a frontal face, from which said optical information is to be arranged at a distance comprised between a minimum significant work distance and a maximum work distance defining a significant work range;
illuminating means for emitting an illuminating pattern so as to permit said acquisition of said optical information;
aiming means for emitting an aiming pattern so as to indicate to a user a field of view of said reading apparatus;
indicating means for emitting a reading apparatus outcome pattern so as to supply indications to a user relating to said acquisition of said optical information;
said illuminating means, said aiming means and said indicating means comprising respective non-coherent light sources, and in which, for said reading apparatus, at least said illuminating means and/or said aiming means and/or said indicating means are configurable by a plurality of operating parameters, for each of which respective permissible values are selectable, that is able to influence the behaviour of said reading apparatus with an effect that is detectable by said user during operation of the reading apparatus;
and wherein said plurality of operating parameters comprises the wavelength of each of said light sources,
the permissible values of said wavelength of said source of said aiming means being comprised in a range from 430 to 470 nm;
the permissible values of said wavelength of said source of said illuminating means being comprised in a range from 590 to 650 nm; and
the permissible values of said wavelength of said source of said indicating means being comprised in a range from 530 to 560 nm.

* * * * *